United States Patent
Hill

[11] 3,838,881
[45] Oct. 1, 1974

[54] CONTOURED BODY PANEL
[75] Inventor: Ronald C. Hill, Rochester, Mich.
[73] Assignee: General Motors Corporation, Detroit, Mich.
[22] Filed: Dec. 6, 1973
[21] Appl. No.: 422,560

[52] U.S. Cl............ 296/28 R, 280/152 R, 296/1 R
[51] Int. Cl............................................. B62d 27/00
[58] Field of Search....... 296/28 R, 1 R; 280/152 R, 280/152 A, 153 R, 153 A, 153 B; D12/184, 196

[56] References Cited
UNITED STATES PATENTS
1,228,211   5/1917   Holland........................... 280/153 R
3,684,311   8/1972   Pierce............................. 280/152 R Primary Examiner—Robert G. Sheridan
Assistant Examiner—Donald W. Underwood
Attorney, Agent, or Firm—Herbert Furman

[57] ABSTRACT

A motor vehicle body panel has a sawtooth cross section including unseen generally horizontal surfaces facing downwardly toward the road surface to receive material such as dirt thrown thereagainst by a tire. Alternating with the unseen generally horizontal surfaces are generally vertical normally observable surfaces which are slanted inboard somewhat so as to be protected against being struck by the thrown material. The alternate horizontal and vertical surfaces extend longitudinally of the vehicle in the areas of those body panels subject to being struck by the thrown material. The generally vertical observable surfaces are preferably disposed at an angle in which the plane of the generally vertical surfaces intersects the road surface at a point outboard of the outer point of contact of the tire with the road surface so as to be protected by the generally horizontal surface from being struck by material which may be thrown by the very outermost edge portion of the tire.

2 Claims, 2 Drawing Figures

CONTOURED BODY PANEL

The invention relates to a body panel for a motor vehicle and more particularly to a body panel having a contour which reduces the visibility of panel surfaces which might be struck by material thrown against the body panel by the vehicle tire.

It is desirable in the design of automotive vehicle bodies to provide a swept under appearance in which such body panels as the rocker panel, fender extension panel, door panels and rear quarter panels are contoured so as to be inboard of the vehicle tires. This contouring of the vehicle body panels render the panels subject to being struck by material such as dirt thrown thereagainst by the tire as it rolls on the road surface. Mud and dirt thrown against the panel adhere to the surface and result in unsightly dirty patches immediately rearward of the tires.

It is known to attach a deflecting shield to the vehicle body in the region of the wheel opening so as to prevent the body panels from being struck by thrown material such as dirt.

It is also known to provide a decorative shield which is attached to the body panels in the region subject to being struck by thrown material.

The present invention provides a body panel having a contour which reduces the visibility of surface which may be struck by material thrown against the body panel. Generally the present invention provides a body panel having a sawtooth crossection including unseen generally horizontal surfaces facing downwardly to receive the material thrown thereagainst by the tires. Alternating with the unseen generally horizontal surfaces are generally vertical and normally observable surfaces which are slanted inboard somewhat so as to be protected against being struck by the thrown material. The alternate horizontal and vertical surfaces extend longitudinally of the vehicle in the area thereof subject to being struck by the thrown material. The contour may accordingly be provided on the fender extensions, the rocker panels and the vehicle doors as well as other tucked under body surfaces which may be struck by thrown material. The generally vertical observable surfaces are preferably disposed at an angle in which the plane of the generally vertical surface intersects the road surface at a point outboard of the outer point of contact of the tire with the road surface so as to be protected by the generally horizontal surface from being struck by material which may be thrown by the outer edge portion of the tire.

Referring to the drawings.

Figure 1:
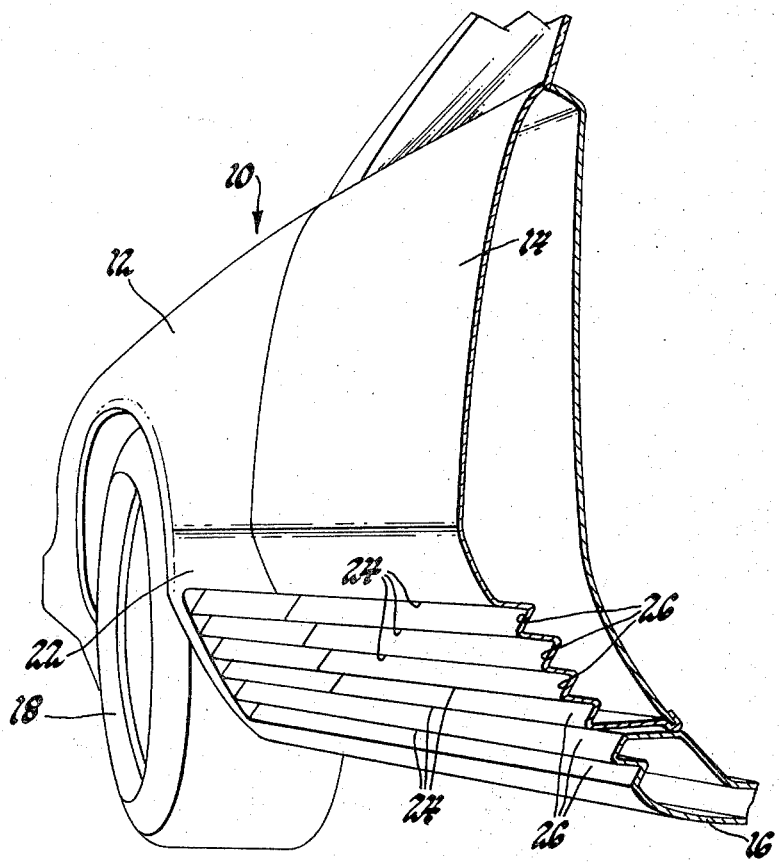
FIG. 1 is a partial perspective view of a vehicle having body panels according to the invention.
Figure 2:
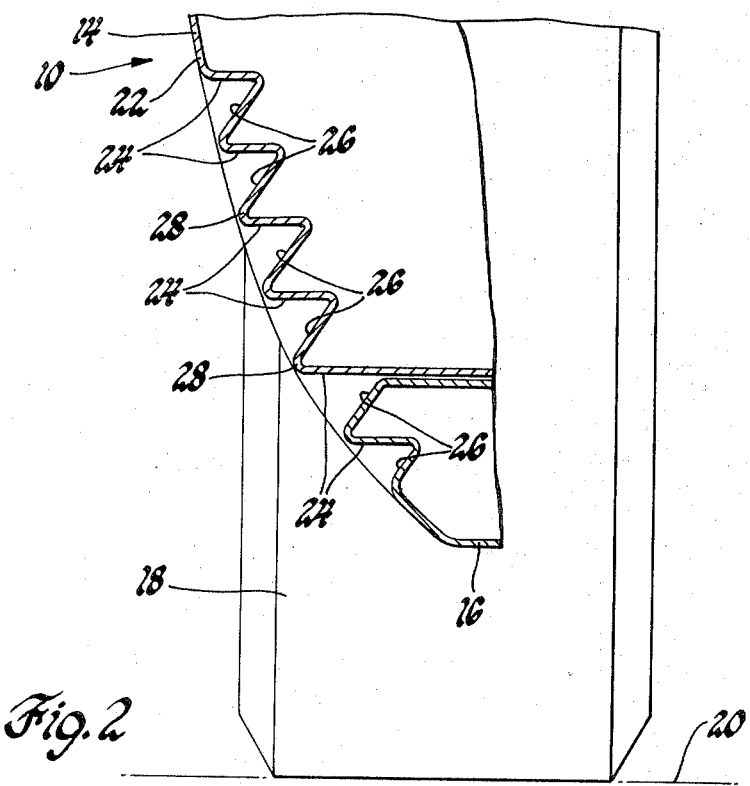
FIG. 2 is a cross-sectional view of a body panel having a contour according to the invention.

Referring to FIG. 1 a motor vehicle is shown having a body 10 including a front fender 12, a door 14 and a rocker panel 16. The motor vehicle has a front wheel 18 which contacts the road surface 20 and rolls thereon as the vehicle moves. The vehicle also has a right front tire and rear tires which are not shown. The rocker panel 16 as best seen in FIG. 2 is located inboard of the tires. Similarly, the front fender 12 has a lower extension portion 22 which is swept under so as to be at least partially inboard of the tire 18. Similarly the lower portion of the door panel 14 is swept under to match the contour of the fender extension 22 and rocker panel 16 so that it also is at least partially inboard of the tire 18. It will be apparent that the portions of these panels situated inboard of the 18 will be subject to being struck by stones and other objects thrown upwardly and rearwardly by the tire 18 as it rolls on the road surface 20.

As best seen in FIG. 2 each of these panels has a contour which precludes the visibility of damage to the panels by thrown objects. Each of the panels is formed to provide a plurality of vertically spaced generally horizontal planar surfaces 24 which face downwardly toward the road surface. Accordingly, these generally horizontal planar surfaces 24 are not observable by a person viewing the outside of the vehicle body from a normal vantage point. Alternating with and integrally connecting these horizontal surfaces 24 are generally vertical planar surfaces 26 which are observable from the normal point of observation of a person viewing the vehicle body. The generally vertical surfaces 26 are slanted inboard somewhat so that the outboard edges 28 of the generally horizontal surfaces 24 protect the generally vertical surfaces 26 from being struck by thrown materials.

As seen in FIG. 2 the angle of the generally vertical surfaces 26 is preferably such that a continuation of the plane of the surface 26 intersects the road surface outboard of the point of contact of the outer edge of the tire with the road surface. Accordingly, material which may happen to be thrown upwardly by the very outboard edge of the tire and at an inwardly directed trajectory cannot strike the generally vertical surfaces 26. It will be apparent that the generally vertical surfaces 26 need not all be at identical angles as shown in the drawing but rather may be placed at varying angles as desired by the designer. It will be apparent that the body panel contour of this invention may be provided integrally in the panels or alternatively may be provided on a decorative panel which is attached to the body panels.

What is claimed is:

1. In a motor vehicle having a tire rolling on the road surface, a body panel comprising: a plurality of vertically spaced first surfaces being disposed generally parallel to the road surface for receiving material thrown from the tire and to preclude normal visual observation of the first surfaces, said first surfaces having inner and outer edges, and a plurality of second surfaces alternating in vertical progression with the first surfaces and integrally connecting the first surfaces, each of said second surfaces being connected to an inner and an outer edge of succeeding first surfaces, the second surfaces being disposed at an angle extending generally upwardly and inwardly of the body to be normally visually observable and to be protected by the first surfaces from being struck by the thrown material, the first and second surfaces extending longitudinally of the vehicle in the general area thereof subject to being struck by thrown material.

2. In a motor vehicle having a tire with inboard and outboard road surface contacting edge portions and a body panel having a portion located inboard of the outboard edge portion of the tire, means for reducing the visibility of body panel surfaces subjected to material thrown thereagainst by the rolling tire and comprising; a plurality of vertically spaced first surfaces facing downwardly in a plurality of generally horizontal planes to receive the thrown material and preclude normal visual observation of the first surfaces, said first surfaces having inner and outer edges, and a plurality of second surfaces alternating in vertical progression with the first surfaces and integrally connecting the first surfaces, each of said second surfaces being connected to an inner and an outer edge of succeeding first surfaces, each of the second surfaces being disposed in a plane which intersects the road surface beyond the outboard edge portion of the tire to be normally visually observable and to be protected by the first surfaces from being struck by the thrown material, the first and second surfaces extending longitudinally of the vehicle on the area thereof subject to being struck by said thrown material.

* * * * *